(Model.)

D. W. BARR.
GATE LATCH.

No. 260,355. Patented July 4, 1882.

Witnesses
Frank P. Kinsey
Samuel T. F. Kinsey

Inventor
Daniel W. Barr
Jr Thomas P. Kinsey
Atty

UNITED STATES PATENT OFFICE.

DANIEL W. BARR, OF READING, PENNSYLVANIA, ASSIGNOR OF ONE-HALF TO JOHN KEPPLEMAN, OF SAME PLACE.

GATE-LATCH.

SPECIFICATION forming part of Letters Patent No. 260,355, dated July 4, 1882.

Application filed March 16, 1882. (Model.)

*To all whom it may concern:*

Be it known that I, DANIEL W. BARR, of the city of Reading, county of Berks, State of Pennsylvania, have invented a new and useful Improvement in Gate-Latches, of which the following is a specification.

This improvement relates more particularly to that class of latches adapted to gates swinging indifferently inward or outward, and is applicable to farm, lawn, and yard gates.

Figure 1:
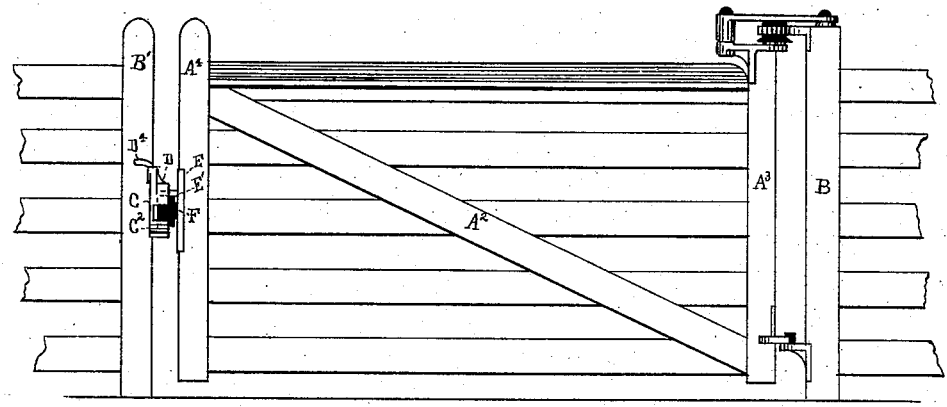
Figure 2:
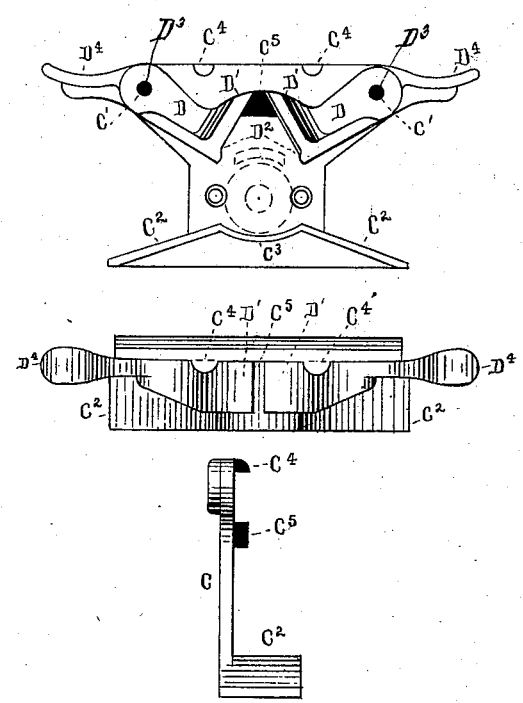
Figure 3:
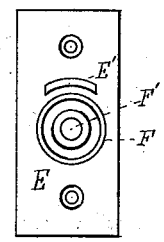
Figure 3:
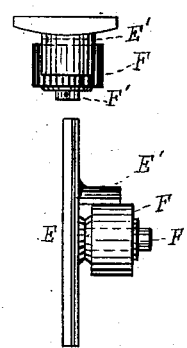

Referring to the drawings herewith, forming part of this specification, in which similar parts are marked by letters of corresponding form, Figure 1 represents a front elevation of a farm-gate with the latch attached; Fig. 2, elevation and details of the latch-post irons; Fig. 3, elevation and details of the latch-stile irons.

A represents the gate; A', the rails; A$^2$, the brace; A$^3$, the hinge-stile; A$^4$, the latch-stile; B, the hinge-post; B', the latch-post; C, the locking-plate provided with right and left inclines, C$^2$, fulcrum-holes C' C' for the locking-pawls, and bolt or screw holes for fastening to the latch-post; C$^3$, a depression to receive the roller; C$^4$ C$^4$, stops; C$^5$, abutment; D D, locking pawls or dogs having foot D' and heels D$^2$, fulcrum-pin D$^3$, and thumb-piece D$^4$. E represents the anti-sagging stile-plate, provided with a guard, E', and an anti-friction roller, F, with pin F'.

It is a well-known and conceded axiom that all gates, and particularly large gates used upon farms, sustain more injury and are more distorted while closed than when they are freely used, owing to the fact that the latches as usually arranged do not give any support to the latch-stile. Consequently the gate must sag, become racked, and wear out before its time. My invention provides a remedy for this, the post locking-plate being so arranged that when the anti-friction roller F of the stile-plate E comes in contact with one of the incline planes C$^2$ C$^2$, striking the plate upon either side, the momentum carries the roller up the plane and it drops into the recess C$^3$, and, being rigidly held upon the pin F', the weight of one-half of the gate is held upon the latch-post, and the gate cannot, under ordinary circumstances, rack or change its form. Consequently it will last for a much longer period than when hung, as usual, upon a loose vibrating latch.

The operation of the latch is as follows: In a state of rest, the gate closed, the roller F, as described, rests in the depression C$^3$, while the guard E' is lying between the heels of the dogs D D and just clearing the same. The dogs D D are pivoted at C' C', with their toes D' D' resting against and supported by the abutment C$^5$, the thumb-pieces projecting within easy reach on either side of the gate. To swing the gate upon its hinges it is necessary to release the roller. This is done by pressing the thumb-piece of the dog upon the locking-plate in advance of the desired swing of the gate. This permits the roller to pass out and the gate to swing in the direction of its exit. The gate, if swinging upon self-acting hinges, will close of itself, or else it is swung back by hand. In either case the roller F mounts the incline C$^2$ and the guard E' rides under and lifts the dog D, which is prevented from rising beyond the necessary point by the stop C$^4$, and immediately the guard has passed the heel D$^2$ the dog drops into place and the gate is locked. No matter with what force the gate is thrown shut, it cannot pass out on the opposite side or rebound from the entering side, the dogs D absolutely locking the gate the moment the roller reaches the center of the depression C$^3$.

All the details of this latch arrangement are inexpensive, easily cast, requiring but a small amount of fitting to prepare them for application. Where a gate is intended to open only in one direction the latch locking plate has but one incline and one dog, a positive stop being cast on the plate similar in form to the foot of the dog.

I am aware that I am not the first to provide a remedy for the sagging of the gate or to arrange automatic locking devices operating to lock the gate, as it may be closed from either side, (see patents of J. Kindel, February 22, 1870, No. 100,044; Earl and Hunter, June 14, 1870, No. 104,287; and W. R. Goodrich, June 21, 1870, No. 104,447,) and therefore do not broadly claim the same; but I believe myself to be the first to so combine the parts as to produce a cheap and positive automatic self-locking latch, easily applied, and of durable construction.

Having described my invention and its mode of operation, and the drawings being sufficiently detailed to enable an expert to construct the same, I desire to secure by Letters Patent the following claim:

In a reversible or fixed gate-latch, the post locking-plate C, provided with dog-arms $C'\ C'$, incline planes $C^2\ C^2$, depression $C^3$, stops $C^4\ C^4$, and abutment $C^5$, in combination with the latch-post $B'$, dogs D D, stile-post roller F, guard $E'$, and stile-plate E, substantially as shown, and for the purpose described.

DANIEL W. BARR.

Witnesses:
F. P. HUMMEL,
THOMAS P. KINSEY.